US008612225B2

(12) United States Patent
Arakawa et al.

(10) Patent No.: US 8,612,225 B2
(45) Date of Patent: Dec. 17, 2013

(54) VOICE RECOGNITION DEVICE, VOICE RECOGNITION METHOD, AND VOICE RECOGNITION PROGRAM

(75) Inventors: Takayuki Arakawa, Tokyo (JP); Ken Hanazawa, Tokyo (JP); Masanori Tsujikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 884 days.

(21) Appl. No.: 12/528,022

(22) PCT Filed: Feb. 26, 2008

(86) PCT No.: PCT/JP2008/053331
§ 371 (c)(1),
(2), (4) Date: Aug. 20, 2009

(87) PCT Pub. No.: WO2008/108232
PCT Pub. Date: Sep. 12, 2008

(65) Prior Publication Data

US 2010/0070277 A1 Mar. 18, 2010

(30) Foreign Application Priority Data

Feb. 28, 2007 (JP) ................................ 2007-048898

(51) Int. Cl.
*G10L 15/00* (2013.01)

(52) U.S. Cl.
USPC ........... 704/246; 704/275; 704/267; 704/257; 704/256.2; 704/256; 704/249; 704/244; 704/242; 704/240; 704/238; 704/235; 704/226; 704/200.1; 381/61

(58) Field of Classification Search
USPC ............. 704/240, 256, 275, 267, 257, 256.2, 704/249, 246, 244, 242, 238, 235, 226, 704/200.1; 381/61
See application file for complete search history.

(56) References Cited

U.S. PATENT DOCUMENTS

| | | | | |
|---|---|---|---|---|
| 5,515,475 | A * | 5/1996 | Gupta et al. | 704/242 |
| 5,839,101 | A * | 11/1998 | Vahatalo et al. | 704/226 |
| 5,842,163 | A * | 11/1998 | Weintraub | 704/240 |
| 5,899,973 | A * | 5/1999 | Bandara et al. | 704/256.2 |
| 6,018,708 | A * | 1/2000 | Dahan et al. | 704/244 |
| 6,208,964 | B1 * | 3/2001 | Sabourin | 704/244 |

(Continued)

FOREIGN PATENT DOCUMENTS

| | | |
|---|---|---|
| JP | 6-067698 A | 3/1994 |
| JP | 8-506430 A | 7/1996 |

(Continued)

OTHER PUBLICATIONS

International Search Report for PCT/JP2008/053331 mailed Jun. 10, 2008.

(Continued)

*Primary Examiner* — Michael Colucci

(57) ABSTRACT

A voice recognition device that recognizes a voice of an input voice signal, comprises a voice model storage unit that stores in advance a predetermined voice model having a plurality of detail levels, the plurality of detail levels being information indicating a feature property of a voice for the voice model; a detail level selection unit that selects a detail level, closest to a feature property of an input voice signal, from the detail levels of the voice model stored in the voice model storage unit; and a parameter setting unit that sets parameters for recognizing the voice of an input voice according to the detail level selected by the detail level selection unit.

22 Claims, 13 Drawing Sheets

(56) References Cited

U.S. PATENT DOCUMENTS

| | | | | | |
|---|---|---|---|---|---|
| 6,301,555 | B2 * | 10/2001 | Hinderks | | 704/200.1 |
| 6,839,667 | B2 * | 1/2005 | Reich | | 704/240 |
| 7,292,975 | B2 * | 11/2007 | Lovance et al. | | 704/235 |
| 7,447,635 | B1 * | 11/2008 | Konopka et al. | | 704/275 |
| 8,392,188 | B1 * | 3/2013 | Riccardi | | 704/249 |
| 2001/0021908 | A1 * | 9/2001 | Hinderks | | 704/267 |
| 2002/0123891 | A1 * | 9/2002 | Epstein | | 704/235 |
| 2003/0125945 | A1 * | 7/2003 | Doyle | | 704/246 |
| 2006/0009973 | A1 * | 1/2006 | Nguyen et al. | | 704/257 |
| 2008/0059184 | A1 * | 3/2008 | Soong et al. | | 704/256 |
| 2008/0255839 | A1 * | 10/2008 | Larri et al. | | 704/238 |
| 2011/0064233 | A1 * | 3/2011 | Van Buskirk | | 381/61 |

FOREIGN PATENT DOCUMENTS

| | | | |
|---|---|---|---|
| JP | 10-149192 | A | 6/1998 |
| JP | 2000261321 | A | 9/2000 |
| JP | 2001075596 | A | 3/2001 |
| JP | 2004117503 | A | 4/2004 |
| JP | 2005004018 | A | 1/2005 |
| JP | 2005234214 | A | 9/2005 |
| JP | 2006091864 | A | 4/2006 |
| WO | 2005010868 | A | 2/2005 |

OTHER PUBLICATIONS

A. Ando. “Real-time Speech Recognition”, Institute of Electronics, Information and Communication Engineers, 2003, pp. 28-33, 40-47, 62-67, 76-87, 126-129, 138-143, 148-165.

R. O. Duda et al., “Pattern Classification Second Edition”, John Wiley & Sons, New Technology Communications, 2003, pp. 528-529.

* cited by examiner

VOICE RECOGNITION DEVICE, VOICE RECOGNITION METHOD, AND VOICE RECOGNITION PROGRAM

The present application is the National Phase of PCT/JP2008/053331, filed Feb. 26, 2008, which is based upon and claims priority from Japanese patent application 2007-048898 (filed on Feb. 28, 2007) the content of which is hereby incorporated in its entirety by reference in this specification.

TECHNICAL FIELD

The present invention relates to a voice recognition device, a voice recognition method, and a voice recognition program for recognizing voices, and more particularly to a voice recognition device, a voice recognition method, and a voice recognition program that increase voice recognition accuracy at a lower calculation cost by determining sound features and controlling the voice recognition related parameters.

BACKGROUND ART

In general, a voice recognition device is used to recognize received voices that are then converted to text for use in applications. For example, Patent Document 1 discloses a device that recognizes voices at high recognition accuracy without increase in the calculation cost while preventing a correct answer from being pruned. Non-Patent Document 1 also describes a general voice recognition technological method and a voice recognition real-time technology.

Patent Document 1:

Japanese Patent Publication Kokai JP2001-75596A (paragraphs 0063-0070, FIGS. 6-8)

Non-Patent Document 1:

Akio Ando "Real-time Speech Recognition", Institute of Electronics, Information and Communication Engineers, pp. 28-33, 40-47, 62-67, 76-87, 126-129, 138-143, 148-165

SUMMARY

All the disclosed contents of Patent Document 1 and non-Patent Document 1 given above are hereby incorporated by reference thereto in this application. The following gives an analysis of the technology related to the present invention.

FIG. 12 is a block diagram showing an example of the configuration of a general voice recognition device that uses the voice recognition technology described in Non-Patent Document 1. As shown in FIG. 12, a voice recognition device generally comprises an input signal acquisition unit 91, a feature amount calculation unit 92, an acoustic model 93, a language model 94, a network search unit 95, and a recognition result output unit 96.

The input signal acquisition unit 91 acquires (receives) input signals (voice signals) partitioned on a unit time basis. The feature amount calculation unit 92 calculates the feature amount from the input signals received by the input signal acquisition unit 91. The acoustic model 93 stores an acoustic model in advance. The language model 94 stores a language model in advance. The network search unit 95 searches for candidates for a word string as a result of voice recognition based on the feature amount calculated by the feature amount calculation unit 92, the acoustic model stored in the acoustic model 93, and the language model stored in the language model 94. The recognition result output unit 96 outputs candidates for a word string searched for by the network search unit.

In searching for a word string by means of the network search unit 95, the general voice recognition device shown in FIG. 12 uses the feature amount calculated by the feature amount calculation unit 92, the acoustic model stored in the acoustic model storage unit 93, and the language model stored in the language model storage unit 94. First, the network search unit 95 performs a word string search processing to search for a word string having the highest likelihood given by equation (1).

[Expression 1]

$$\hat{\omega}=\omega_0, \ldots, \omega_m \quad \text{Equation (1)}$$

In this case, when the search method disclosed in Non-Patent Document 1 is used (see Chapter 6 in Non-Patent Document 1), the network search unit 95 can find a word string having the highest likelihood by using equation (2) when the input signal x=x0, . . . , xT is given in the chronological order.

[Expression 2]

$$\hat{\omega}=\operatorname{argmax}\{\log P(x|\omega)+\lambda \log P(\omega)\} \quad \text{Equation (2)}$$

In the above equation, λ is a parameter called a language weight. A larger value of the weight λ causes the device to make a search with focus on a language model, while a smaller value of the weight causes the device to make a search with focus on the acoustic model. P(x|ω) is likelihood of the word string ω for the input signal x calculated using the acoustic model, and P(ω) is probability of occurrence of the word string ω calculated by using the language model.

In equation (2), argmax means calculation for finding the highest-likelihood word string for all possible combinations of word strings. However, because performing the above operation for all word strings requires an extremely high calculation cost, the candidates (hypotheses) for the word string are pruned in the actual operation. To prune the candidates for the word string, pruning parameters, such as the number of hypotheses and the likelihood width, must be set.

For the general voice recognition device described above, there are multiple parameters, such as the language weight and the pruning parameter described above, which must be set. The calculation cost and the recognition accuracy of the voice recognition device may be changed by controlling those parameters.

The voice recognition device described in Patent Document 1 allows the user to control the voice recognition related parameters described above. FIG. 13 is a block diagram showing an example of the configuration of the voice recognition device described in Patent Document 1. As shown in FIG. 13, the voice recognition device described in Patent Document 1 comprises: voice data storage means 911, sound analysis means 912, acoustic model storage means 913, word dictionary storage means 914, likelihood operation means 915, pruning means 916, recognition result output means 917, simplified acoustic model storage means 921, simplified acoustic model probability operation means 922, order variation calculation means 923, and language weight change means 931.

The voice data storage means 911 stores received voices. The sound analysis means 912 analyzes the sound of voice data stored in the voice data storage means 911 and outputs sound feature vectors: The acoustic model storage means 913 stores the acoustic model of phonemes. The word dictionary storage means 914 stores a word dictionary. The likelihood operation means 915 calculates likelihood of a hypothesis, which is a recognition candidate, based on sound feature vectors output by the sound analysis means 912, the acoustic model stored in the acoustic model storage means 913, and the word dictionary stored in the word dictionary storage means 914. The pruning means 916 calculates the highest likelihood from the likelihoods of the hypotheses calculated by the likelihood operation means 915 and discards a hypothesis whose likelihood is equal to or lower than the calculated highest-likelihood by a predetermined beam width. The recognition result output means 917 outputs hypotheses, selected by the pruning means 916, as recognition candidates.

In the voice recognition device having the components described above, the simplified acoustic model storage means 921 stores simplified acoustic models of phonemes, respectively. The simplified acoustic model probability operation means 922 calculates the simplified sound output probability of the HMM state each at a time of day in a predetermined period of time before and after the current time of day based on the sound feature vectors output by the sound analysis means 912 and the simplified acoustic model stored in simplified acoustic model storage means 921. The order variation calculation means 923 finds order of simplified sound output probabilities of the HMM states each corresponding to a time of day calculated by the simplified acoustic model probability operation means 922, calculates order variation width of the HMM states in a predetermined period of time before and after the current time of day, and calculates an average of the order variation width of the HMM state. And, the voice recognition device described in Patent Document 1 adjusts the voice-recognition related parameters based on the average of the order variation width calculated by the order variation calculation means 923.

The voice recognition device shown in FIG. 13 and described in Patent Document 1 comprises the language weight change means 931 that changes the language weight that is one of the parameters.

By configuring the device as described above, the voice recognition device described in Patent Document 1 allows the parameters to be changed so that the recognition accuracy is maximized within a predetermined calculation cost.

However, the method used by the voice recognition device described in Patent Document 1 requires the order variation calculation means 923 to conduct the time-consuming calculation of the average of the order changes in the HMM states before and after one particular time of day. This results in the problem that the processing for calculating the optimum parameters causes a delay. Another problem with the method of the voice recognition device described in Patent Document 1 is that the calculation cost is not always reduced because the likelihood calculation, which requires a high calculation cost, is performed for the simplified acoustic model and for the acoustic model separately.

As described above, the voice recognition system (voice recognition device) using the voice recognition technology described in Patent Document 1 and non-Patent Document 1 has the following problems. A first problem is that the voice recognition method, which adjusts the parameters by calculating the order variations in the HMM (Hidden Markov Model) states using simplified voice model, causes a processing delay because the method must conduct a time-consuming averaging calculation for finding the order variations. A second problem is that the voice recognition method, which adjusts parameters by calculating the order variations in the HMM states using simplified voice model, must conduct an extra likelihood calculation for the simplified model and this extra calculation may require a higher calculation cost.

In view of the foregoing, it is an object of the present invention to provide a voice recognition device, a voice recognition method, and a voice recognition program that judge the sound feature and recognize voices using appropriate parameters that increase the recognition accuracy at a low cost. It is another object of the present invention to provide a voice recognition device, a voice recognition method, and a voice recognition program that allow the appropriate parameters to be set without processing delay by considering the number of competing candidates at the same time of day. It is still another object of the present invention to provide a voice recognition device, a voice recognition method, and a voice recognition program that require a smaller amount of calculation for finding appropriate parameters.

In accordance with a first aspect of the present invention, there is provided a voice recognition device that recognizes a voice of an input voice signal, comprising a voice model storage unit (for example, implemented by voice model storage unit 7) that stores in advance a predetermined voice model having a plurality of detail levels, the plurality of detail levels being information indicating a feature property of a voice for the voice model; a detail level selection unit (for example, implemented by detail level judgment unit 9) that selects a detail level, closest to a feature property of an input voice signal, from the detail levels of the voice model stored in the voice model storage unit; and a parameter setting unit (for example, implemented by parameter setting unit 10) that sets parameters for recognizing the voice of an input voice according to a detail level selected by the detail level selection unit.

The voice recognition device described above may be configured such that the detail level selection unit finds a detail level on a unit time basis and selects the detail level closest to the feature property of the input voice signal.

The voice recognition device described above may be configured such that the detail level selection unit performs statistical analysis of the detail level, selected on a unit time basis, for a plurality of unit times and finds a detail level of one particular unit time of interest of interest.

The voice recognition device described above may further comprise a distance calculation unit (for example, implemented by distance calculation unit 8) that calculates distance information indicating a difference between the voice model stored in the voice model storage unit and the feature property of an input voice signal wherein the distance calculation unit calculates the distance information sequentially from low detail level distance information to higher detail level distance information, or sequentially from high detail level distance information to lower detail level distance information and the detail level selection unit finds a detail level corresponding to a minimum of the distance information calculated by the distance calculation unit.

The voice recognition device described above may be configured such that the voice model storage unit stores in advance a voice model having a parent-child structure.

The voice recognition device described above may further comprise sound a model storage unit (for example, implemented by acoustic model storage unit 3) that stores a predetermined acoustic model in advance; and a word string search unit (for example, implemented by network search unit 5) that searches for, and extracts, a word string as a result of voice recognition based on the parameters that are set by the parameter setting unit wherein the acoustic model storage unit stores in advance an acoustic model having predetermined relevance to the voice model stored in the voice model storage unit; and the word string search unit searches for a word string using relevance between the voice model and the acoustic model.

The voice recognition device described above may be configured such that the parameter setting unit sets at least one of a language weight parameter and a pruning parameter for performing predetermined pruning processing according to the detail level selected by the detail level selection unit.

The voice recognition device described above may further comprise an acoustic model storage unit (for example, implemented by acoustic model storage unit 13) that stores a plurality of predetermined acoustic models in advance; a language model storage unit (for example, implemented by language model storage unit 14) that stores a plurality of predetermined language models in advance; and a model selection unit (for example, implemented by model selection unit 12) that selects a set of an acoustic model and a language model from the plurality of acoustic models, stored in the acoustic model storage unit, and the plurality of language models stored in the language model storage unit, according to the detail level selected by the detail level selection unit.

The voice recognition device described above may further comprise an output change unit (for example, implemented by operation/response setting unit 15) that changes an output method or an output content of a voice recognition result of the input voice signal according to the detail level selected by the detail level selection unit.

The voice recognition device described above may further comprise a voice model update unit (for example, implemented by model learning unit 16) that updates the voice model, stored in the voice model storage unit, according to the detail level selected by the detail level selection unit.

In accordance with a second aspect of the present invention, there is provided a voice recognition method that recognizes a voice of an input voice signal, comprising: a detail level selection step that selects a detail level, closest to a feature property of an input voice signal, from a plurality of detail levels of a predetermined voice model stored in advance, the plurality of detail levels being information indicating a feature property of a voice for the voice model; and a parameter setting step that sets parameters for recognizing the voice of an input voice according to the selected detail level.

The voice recognition method described above may be configured such that the detail level selection step finds a detail level on a unit time basis and selects the detail level closest to the feature property of the input voice signal.

The voice recognition method described above may be configured such that the detail level selection step performs statistical analysis of the detail level, selected on a unit time basis, for a plurality of unit times and finds a detail level of one particular unit time of interest.

The voice recognition method described above may further comprise: a distance calculation step that calculates distance information indicating a difference between the voice model stored in advance and the feature property of an input voice signal, wherein the distance calculation step calculates the distance information sequentially from low detail level distance information to higher detail level distance information, or sequentially from high detail level distance information to lower detail level distance information and the detail level selection step finds a detail level corresponding to a minimum of the calculated distance information.

The voice recognition method described above may be configured such that the detail level closest to the feature property of the input voice signal is selected based on a voice model stored in advance and having a parent-child structure.

The voice recognition method described above may further comprise: a word string search step that searches for, and extracting, a word string as a result of voice recognition based on the parameters that are set wherein an acoustic model having predetermined relevance to the voice model is stored in advance and the word string search step searches for a word string using relevance between the voice model and the acoustic model.

The voice recognition method described above may be configured such that the parameter setting step sets at least one of a language weight parameter and a pruning parameter for performing predetermined pruning processing according to the selected detail level.

The voice recognition method described above may further comprise: a model selection step that selects a set of an acoustic model and a language model from a plurality of acoustic models stored in advance and a plurality of language models stored in advance according to the selected detail level.

The voice recognition method described above may further comprise: an output change step that changes an output method or an output content of a voice recognition result of the input voice signal according to the selected detail level.

The voice recognition method described above may further comprise: a voice model update step that updates the voice model stored in advance according to the selected detail level.

In accordance with a third aspect of the present invention, there is provided a voice recognition program that causes a computer to recognize a voice of an input voice signal, the program causing the computer to execute detail level selection processing that selects a detail level, closest to a feature property of an input voice signal, from a plurality of detail levels of a predetermined voice model stored in advance, the plurality of detail levels being information indicating a feature property of a voice for the voice model; and parameter setting processing that sets parameters for recognizing the voice of an input voice according to the selected detail level.

The voice recognition program described above may be configured such that, in the detail level selection processing, the program causes the computer to find a detail level on a unit time basis and select the detail level closest to the feature property of the input voice signal.

The voice recognition program described above may be configured such that, in the detail level selection processing, the program causes the computer to perform a statistical analysis of the detail level, selected on a unit time basis, for a plurality of unit times and find a detail level of one particular unit time of interest.

The voice recognition program described above may further cause the computer to execute distance calculation processing that calculates distance information indicating a difference between the voice model stored in advance and the feature property of an input voice signal wherein, in the distance calculation processing, the program causes the computer to calculate the distance information sequentially from low detail level distance information to higher detail level distance information, or sequentially from high detail level distance information to lower detail level distance information; and, in the detail level selection processing, the program causes the computer to find a detail level corresponding to a minimum of the calculated distance information.

The voice recognition program described above may be configured such that the program causes the computer to select the detail level closest to the feature property of the input voice signal based on a voice model stored in advance and having a parent-child structure.

The voice recognition program described above may further cause the computer, which has a storage unit (for example, acoustic model storage unit 3) that stores, in advance, an acoustic model having predetermined relevance to the voice model, to execute word string search processing that searches for, and extract, a word string as a result of voice recognition based on the parameters that are set wherein, in the word string search processing, the program causes the computer to search for a word string using relevance between the voice model and the acoustic model.

The voice recognition program described above may be configured such that, in the parameter setting processing, the program causes the computer to set at least one of a language weight parameter and a pruning parameter for performing predetermined pruning processing according to the selected detail level.

The voice recognition program described above may further cause the computer to execute model selection processing that selects a set of an acoustic model and a language model from a plurality of acoustic models stored in advance and a plurality of language models stored in advance according to the selected detail level.

The voice recognition program described above may further cause the computer to execute output change processing of changing an output manner or an output content of a voice recognition result of the input voice signal according to the selected detail level.

The voice recognition program described above may further cause the computer to execute voice model update processing that updates the voice model stored in advance according to the selected detail level. Doing so allows the voice model to be adapted to the speaker or noise environment.

In short, the voice recognition device of the present invention is generally configured as follows to solve the problems described above. That is, the voice recognition device has a voice model having multiple detail levels representing the feature property of a voice, selects a detail level closest to the feature property of an input signal, and controls the parameters related to voice recognition according to the selected detail level.

In the configuration described above, the distance to the input signal is compared between a high detail level and a low detail level of the voice model. That is, if the high detail level is closer to the input signal, the feature property of the input signal is close to the feature property of the data used when the acoustic model was developed by learning and, therefore, the voice is recognized using low calculation cost parameters considering that the feature property of the voice is reliable. Conversely, if the low detail level is closer to the input signal, the feature property of the input signal is far from the feature property of the learning data and, therefore, the voice is recognized using parameters, which ensures high accuracy, considering that the feature property of the voice is not reliable. Dynamically controlling the parameters according to the detail level as described above always ensures highly accurate voice recognition at an optimum calculation cost. This achieves the first object of the present invention.

The ability to determine the optimum parameters, based only on the detail level information corresponding to the input signal at one particular time, causes no processing delay. This achieves the second object of the present invention.

Because a voice model having multiple detail levels has a size sufficiently smaller than that of an acoustic model, the calculation cost is reduced as compared with that of the voice recognition method in which a simplified acoustic model is used to find an order change in the HMM state for parameter adjustment (see Patent Document 1). This achieves the third object of the present invention.

According to the present invention, a detail level closest to the feature property of an input voice signal is selected from the detail levels of a voice model and, based on the selected detail level, the parameters for recognizing the input voice are set. Therefore, by judging the sound property, the voice may be recognized using appropriate parameters, which ensure high recognition accuracy, at a low calculation cost. That is, based on the information on a detail level of the voice model to which the input voice signal belongs, the present invention makes it possible to determine whether or not the feature property of the input voice signal is close to that of the voice data used when the acoustic model was developed, and is reliable. Therefore, the parameters for voice recognition may be set and, based on the parameters, voices may be recognized.

According to the present invention, appropriate parameters may be set without processing delay by considering the number of competing candidates at the same time of day. That is, to find the information as to which detail level of the voice model the input voice signal belongs, the present invention requires that only one particular time of target of day be considered without need for conducting the time-consuming averaging calculation. Therefore, the voice may be recognized by setting parameters without processing delay.

According to the present invention, appropriate parameters may be determined with a small amount of operation. That is, a voice model having multiple detail levels has a size sufficiently smaller than that of an acoustic model. Therefore, the parameters may be set and the voice may be recognized with a small increase in the calculation cost.

EXPLANATIONS OF SYMBOLS

Figure 1:
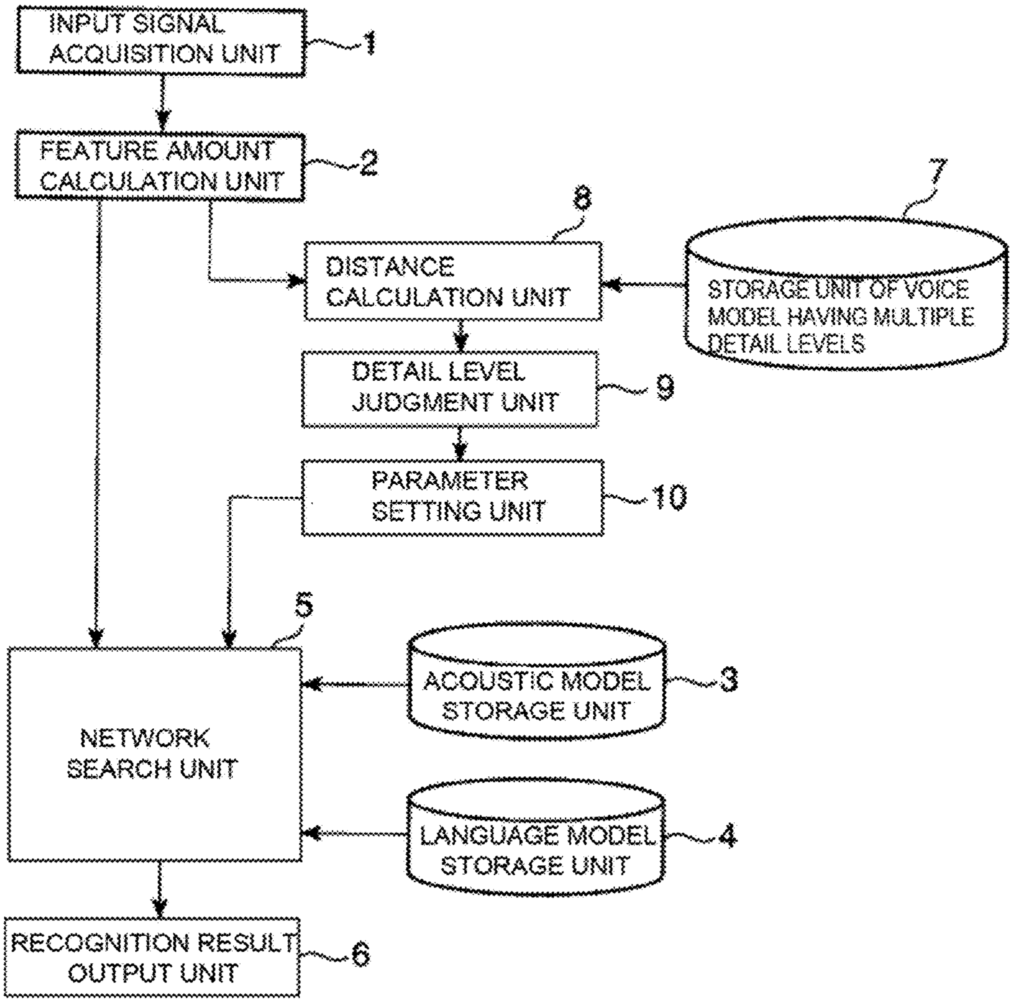
FIG. 1 is a block diagram showing an example of the configuration of a voice recognition device of the present invention.

1 Input signal acquisition unit
2 Feature amount calculation unit

3,13 Acoustic model storage unit
4,14 Language model storage unit
5 Network search unit
6 Recognition result output unit
7,11 Voice model storage unit
8 Distance calculation unit
9 Detail level judgment unit
10 Parameter setting unit
12 Model selection unit
15 Operation/response setting unit
16 Model learning unit

PREFERRED MODES

First Exemplary Embodiment

A first exemplary embodiment of the present invention will be described below with reference to the drawings. FIG. 1 is a block diagram showing an example of the configuration of a voice recognition device of the present invention. As shown in FIG. 1, the voice recognition device comprises an input signal acquisition unit 1, a feature amount calculation unit 2, an acoustic model storage unit 3, a language model storage unit 4, a network search unit 5, a recognition result output unit 6, a voice model storage unit 7, a distance calculation unit 8, a detail level judgment unit 9, and a parameter setting unit 10. The voice recognition device is implemented in the actual device by an information processing device such as a personal computer.

The input signal acquisition unit 1 is implemented in the actual device by the CPU of an information processing device operating under program control. The input signal acquisition unit 1 has the function to acquire (receive) input signals in a divided (or sampled) fashion on a unit time basis. For example, the input signal acquisition unit 1 receives voice signals from a voice input device, such as a microphone, as input signals. In addition, the input signal acquisition unit 1 extracts voice signals stored, for example, in a database in advance as input signals.

The feature amount calculation unit 2 is implemented in the actual device by the CPU of an information processing device operating under program control. The feature amount calculation unit 2 has a function to calculate the feature amount, which indicates the feature property of the input voice, based on the input signal received by the input signal acquisition unit 1.

The acoustic model storage unit 3 and the language model storage unit 4 are implemented in the actual device by a storage device such as a magnetic disk device or an optical disc device. The acoustic model storage unit 3 stores a predetermined acoustic model in advance. The language model storage unit 4 stores a predetermined language model in advance.

The network search unit 5 is implemented in the actual device by a CPU of an information processing device operating under program control. The network search unit 5 has a function to search for candidates for a word string based on the feature amount calculated by the feature amount calculation unit 2, the acoustic model stored in the acoustic model storage unit 3, and the language model stored in the language model storage unit 4. In addition, the network search unit 5 has a function to extract candidates for a word string as a result of voice recognition of input voices based on a search result of candidates for a word string.

The recognition result output unit 6 is implemented in the actual device by the CPU of an information processing device operating under program control. The recognition result output unit 6 has a function to output candidates for a word string searched for by the network search unit 5. The recognition result output unit 6 displays candidates for a word string, for example, on a display device as the voice recognition result of input voices. In addition, the recognition result output unit 6 outputs a file, for example, a file which includes candidates for a word suing, as the voice recognition result of input voices.

In the voice recognition system (voice recognition device) having the components described above, the voice model storage unit 7, distance calculation unit 8, detail level judgment unit 9, and parameter setting unit 10 have the following functions.

The voice model storage unit 7 is implemented in the actual device by a storage device such as a magnetic disk device or an optical disc device. The voice model storage unit 7 stores a voice model, which has multiple detail levels, in advance. The "detail level" refers to a measure that determines whether voice phenomena are represented coarsely or finely using a voice model.

The distance calculation unit 8 is implemented in the actual device by the CPU of an information processing device operating under program control. The distance calculation unit 8 has a function to calculate the distance of the feature amount, calculated by the feature amount calculation unit 2, from each detail level of the voice model stored in the voice model storage unit 7. More specifically, the distance calculation unit 8 calculates a value indicating the difference between the feature amount of an input voice and each detail level to calculate the distance between the feature amount of the input voice and each detail level.

The detail level judgment unit 9 is implemented in the actual device by the CPU of an information processing device operating under program control. The detail level judgment unit 9 has the function to determine the shortest distance between each of the detail levels, calculated by the distance calculation unit 8, and the feature amount, and to find (judge) a detail level that minimizes the distance from the feature amount calculated by the feature amount calculation unit 2. That is, the detail level judgment unit 9 selects a detail level, closest to the feature property of the received voice signal, from the detail levels of the voice model stored in the voice model storage unit 7.

The parameter setting unit 10 is implemented in the actual device by the CPU of an information processing device operating under program control. The parameter setting unit 10 has the function to set parameters, which will be necessary when the network search unit 5 searches for a word string, according to the value of the detail level judged by the detail level judgment unit 9.

As the feature amount, the feature amount calculation unit 2 calculates the value indicating the feature of the voice such as the cepstrum, log spectrum, spectrum, formant position, pitch, and spectrum power changes across (or over) multiple frames of the input voice. The feature amount and the method for calculating the feature amount described in this application are described, for example, in Chapter 2 of Non-Patent Document 1. The contents of Chapter 2 of Non-Patent Document 1 are hereby incorporated in this application by reference thereto.

The acoustic model storage unit 3 stores data, such as an HMM (Hidden Markov Model), as an acoustic model. The acoustic model described in this application is described, for example, in Chapter 3 of Non-Patent Document 1. The acoustic model creation method described in this application is described, for example, in Chapter 14 of Non-Patent Document 1. The contents of Chapter 3 and Chapter 14 of Non-Patent Document 1 are hereby incorporated in this application by reference thereto.

The language model storage unit 4 stores data, such as an N-gram, a word dictionary, and a context-free grammar etc., as the language model. The language model described herein and the voice recognition algorithm using the language model are described, for example, in Chapter 5 of Non-Patent Document 1. The contents of Chapter 5 of Non-Patent Document 1 are hereby incorporated in this application by reference thereto.

The network search unit 5 searches for a word string using a method such as a beam search. That is, the network search unit 5 searches the word string network, represented by the language model stored in the language model storage unit 4, for a correct word string using the acoustic model stored in the acoustic model storage unit 3 and, as a result of the sound recognition of the input sound, extracts candidates for the word string. The word string search method described herein is described, for example, in Chapter 6 of Non-Patent Document 1. The contents of Chapter 6 of Non-Patent Document 1 are hereby incorporated in this application by reference thereto.

The voice model storage unit 7 stores a voice model including multiple detail levels. For example, the voice model storage unit 7 stores data, such as an HMM or a GMM (Gaussian Mixture Model), as a voice model.

An HMM or a GMM is configured by combining multiple probability distribution functions. The Gaussian distribution is usually used for the probability distribution function, but a function other than the Gaussian distribution may also be used. The parameters of the probability distribution function are determined by learning voices using a method such as the EM algorithm. The EM algorithm described in this application is described, for example, in Chapter 4 of Non-Patent Document 1. The contents of Chapter 4 of Non-Patent Document 1 are hereby incorporated in this application by reference thereto.

Figure 2:
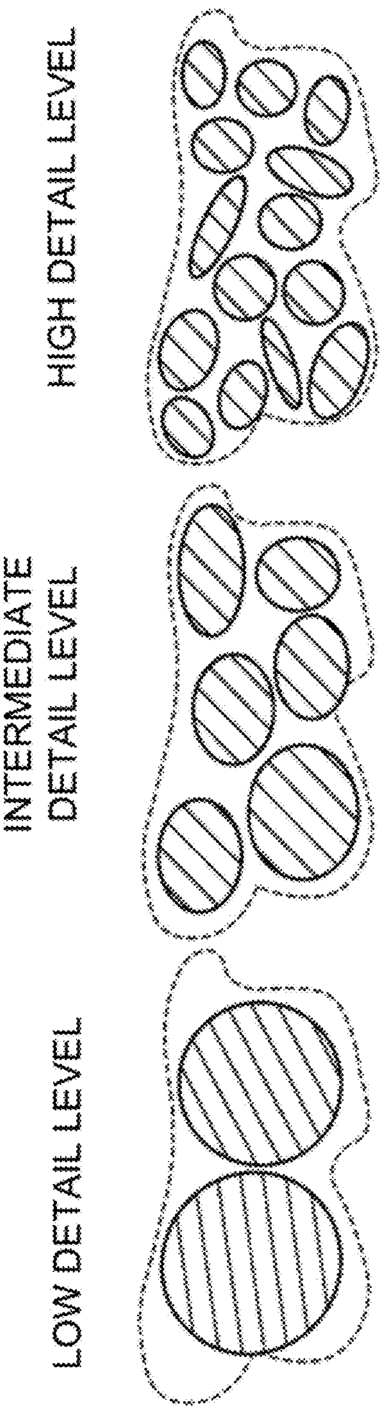
FIG. 2 is a diagram schematically showing an example of a GMM including multiple detail levels.

As the detail level, the voice model has the number of mixtures of probability distribution functions and the average value of probability distribution functions etc. FIG. 2 is a diagram schematically showing an example of a GMM including multiple detail levels. In FIG. 2, an ellipse drawn by the solid line indicates a probability distribution function. As shown in FIG. 2, a low detail level GMM is represented by a smaller number of mixtures of probability distribution functions, while a high detail level GMM is represented by a larger number of mixtures of probability distribution functions.

A voice model having different detail levels is created by one of the following two creation methods: top-down creation method and bottom-up creation method. An example of the top-down creation method is as follows. First, a voice model having a smaller number of mixtures is created by using learning data and, after that, the probability distribution functions configuring the voice model is divided to increase the number of mixtures. The model having an increased number of mixtures is used again for learning. In this way, by repeating the processing of learning and division as described above until a voice model composed of a required number of mixtures is created, the voice model having different detail levels is created.

A voice model having different detail levels may be also generated by creating a voice model by varying the detail level determined by a combination of phonemes such as monophone, diphone, triphone, quinphone, and so on.

An example of the bottom-up voice model creation method is as follows. That is, a voice model having different detail levels is created by rearranging (or reconstructing) a voice model, which is created using some learning means and configured by a mixture of multiple probability distribution functions, according to the distance using a method such as the K-means method or the like. The K-means mentioned here is described, for example, in the document ("Pattern Classification" in New Technical Communication by Richard O. Duda, Peter E. Hart, and David G. Stork, Translation supervised by Morio Onoe, John Wiley & Sons, New Technology Communication, pp.528-529).

The voice model having different detail levels described above is created by a system designer in advance and stored in the voice model storage unit 7.

In this exemplary embodiment, the storage device of the information processing device, which implements the voice recognition device, stores various types of programs for executing the voice recognition processing. For example, the storage device of the information processing device, which implements the voice recognition device, stores the voice recognition program that causes a computer to execute the following two types of processing; one is the detail level selection processing for selecting a detail level, closest to the feature property of a received voice signal, from multiple detail levels wherein the multiple detail levels are included in a predetermined voice model, stored in advance, to indicate the voice feature property for the voice model, and the other is the parameter setting processing for setting the parameters for identifying a received voice according to the selected detail level.

Figure 3:
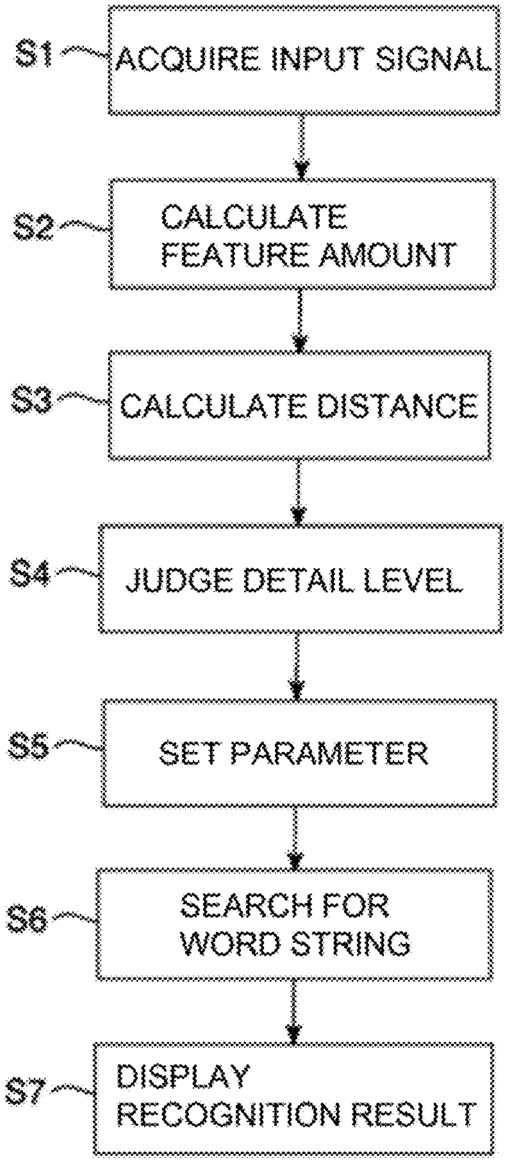
FIG. 3 is a flowchart showing an example of voice recognition processing executed by the voice recognition device.

Next, the following describes the operation. FIG. 3 is a flowchart showing an example of the voice recognition processing executed by the voice recognition device. First, the input signal acquisition unit 1 performs a windowing processing to an input signal (voice signal), acquired (received) via a device such as a microphone, on a unit time basis to take (sample) out and selects the acquired input signal (step S1).

Next, the feature amount calculation unit 2 calculates the feature amount of the input voice based on the per unit time input signal selected by the input signal acquisition unit 1 (step S2). For example, as the feature amount, the feature amount calculation unit 2 calculates the feature amount vector xt of input signal for the t-th unit time.

Next, the distance calculation unit 8 calculates the distance between each of the multiple detail levels of the voice model and the feature amount of the per-unit-time input signal (step S3). In this case, when an HMM or a GMM is used as the voice model, the distance calculation unit 8 calculates the likelihood indicated by equation (3) or the log likelihood, to calculate the distance between the feature amount and the detail level.

[Expression 3]

$$\text{likelihood } P(x_t \mid k) = \frac{1}{\sqrt{(2\pi)^n \left|\sum_k\right|}} \exp\left[-\frac{1}{2}(x_t-\mu_k)' \sum_k^{-1} (x_t-\mu_k)\right] \quad \text{Equation (3)}$$

[Expression 4]

$$\text{log likelihood log } P(x_t \mid k) = -\frac{1}{2}\left[(x_t-\mu_k)' \sum_k^{-1} (x_t-\mu_k) + \log\left|\sum_k\right|\right] + C$$

Equation (4)

In the above equations, μk indicates the average of the kth probability density function. Σk indicates the variance of the kth probability density function. C indicates the constant term. n indicates the number of dimensions of the feature amount vector xt.

When a likelihood or a log likelihood is used, a larger likelihood value or a larger log likelihood value means a shorter distance between the feature amount and the detail level. In calculating the distance between the feature amount and the detail level, the distance calculation unit 8 may calculate the measure of distance, such as a Euclidian distance, instead of a likelihood or a log likelihood. Although the voice model for each detail level is represented by a mixture of multiple probability density functions, the distance between the feature amount of a per-unit-time input signal and the detail level is represented by the distance between the signal and one of multiple probability density functions that is closest.

Next, the detail level judgment unit 9 compares among the distances to the detail levels of the voice model calculated by the distance calculation unit 8 and finds the detail level whose distance to the feature amount, calculated by the feature amount calculation unit 2, is shortest (step S4). That is, the detail level judgment unit 9 checks the multiple detail levels of the voice model stored in the voice model storage unit 7, based on the distances calculated by the distance calculation unit 8, and judges the detail level whose distance to the feature amount, calculated by the feature amount calculation unit 2, is shortest.

In step S4, in addition to the method of finding the detail level on a unit time basis, it is also possible for the detail level judgment unit 9 to conduct a statistical analysis to find the detail level that minimizes the average distance over multiple unit times or over a one-time voice time. That is, the detail level judgment unit 9 may find the detail level for each unit time and select the detail level closest to the feature property of the input voice signal. It is also possible for the detail level judgment unit 9 to find the detail level that minimizes the feature amount based, on the result of the statistical analysis. That is, it is possible for the detail level judgment unit 9 to conduct the statistical analysis of the detail levels ranging over multiple unit times, one detail for each unit time, to find the detail level of one particular unit time of target.

Next, the parameter setting unit 10 sets the parameters, which will be used when the network search unit 5 searches for a word string, using the detail level judged by the detail level judgment unit 9 (step S5). In this case, the parameter setting unit 10 sets the language weight (for example, weight coefficient) parameter and the pruning parameter etc. That is, the parameter setting unit 10 sets at least one of the language weight parameter and the pruning parameter, which is the parameter for predetermined pruning processing, according to the detail level selected by the detail level judgment unit 9. Note that, in addition to the language weight parameter and the pruning parameter, the parameter setting unit 10 may control parameters used for searching for a word string.

The term “pruning” refers to the processing for discarding hypotheses, which are word string candidates, whose likelihood is equal to or lower than a predetermined likelihood width (threshold). For the pruning parameter, a likelihood width value etc., used as the threshold for the pruning processing, is set.

Figure 4:
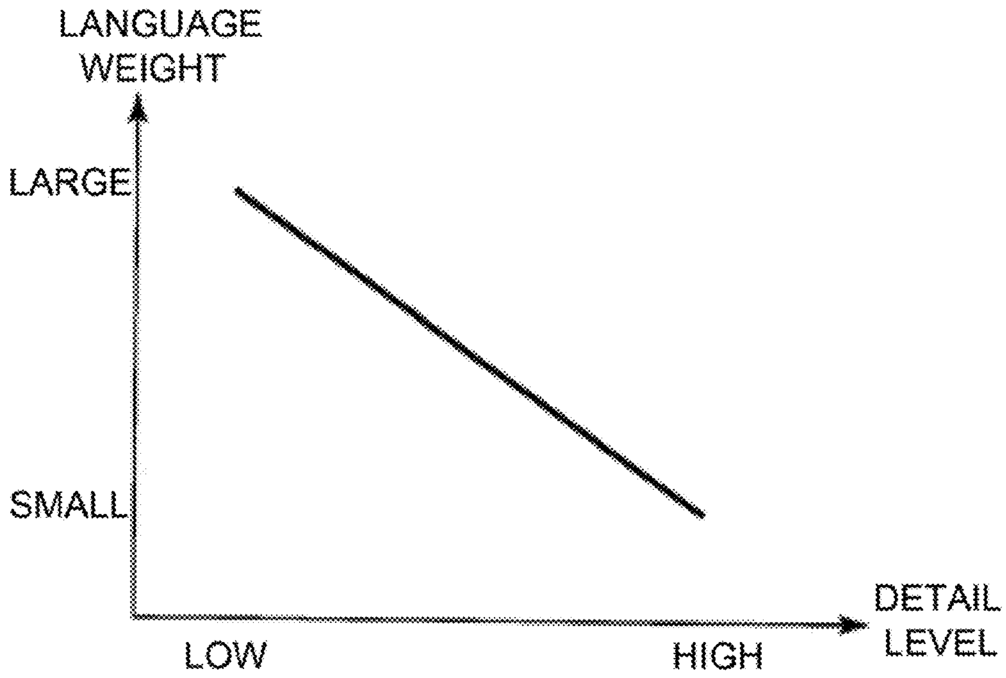
FIG. 4 is a diagram showing the relation between the detail level and the language weight of a voice model.

The parameter setting unit 10 sets the language weight as follows according to the detail level. The parameter setting unit 10 sets a large language weight (for example, a large weight coefficient value) when the detail level is low because the reliability of voice information is low as shown in FIG. 4. Conversely, the parameter setting unit 10 sets a small language weight (for example, a small weight coefficient value) when the detail level is high because the reliability of voice information is high.

The parameter setting unit 10 sets the pruning parameter for use at word string search time as follows. When the detail level is low, the parameter setting unit 10 sets the pruning parameter so that the number of hypotheses is increased because the reliability of voice information is low. Conversely, when the detail level is high, the parameter setting unit 10 sets the pruning parameter so that the number of hypotheses is decreased because the reliability of voice information is high.

Next, the network search unit 5 searches for a word string based on the parameters set by the parameter setting unit 10 (step S6). In this case, the network search unit 5 uses the feature amount calculated by the feature amount calculation unit 2, the acoustic model stored in the acoustic model storage unit 3, and the language model stored in the language model storage unit 4 to search for a word string having the highest likelihood based on equation (2).

Finally, the recognition result output unit 6 outputs (for example, displays) the word string searched for by the network search unit 5 (step S7).

As described above, this exemplary embodiment judges the sound feature and recognizes voices using appropriate parameters that increase recognition accuracy at a low calculation cost.

Figure 5A:
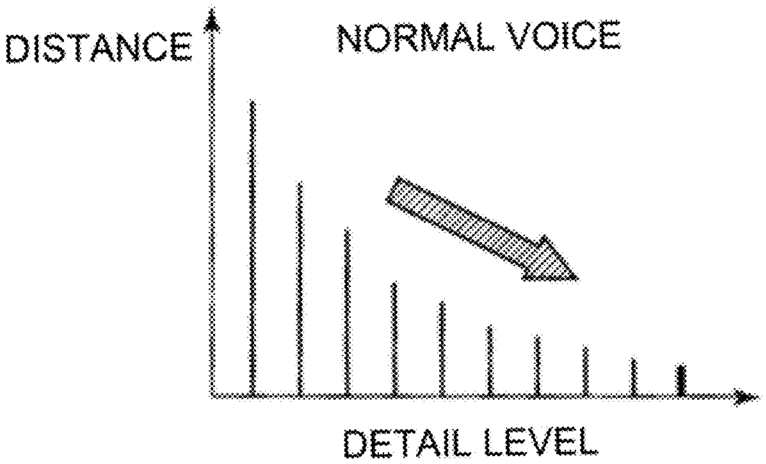
FIGS. 5A and 5B are diagrams showing the relation between the detail level and the distance of a voice model.
Figure 5B:
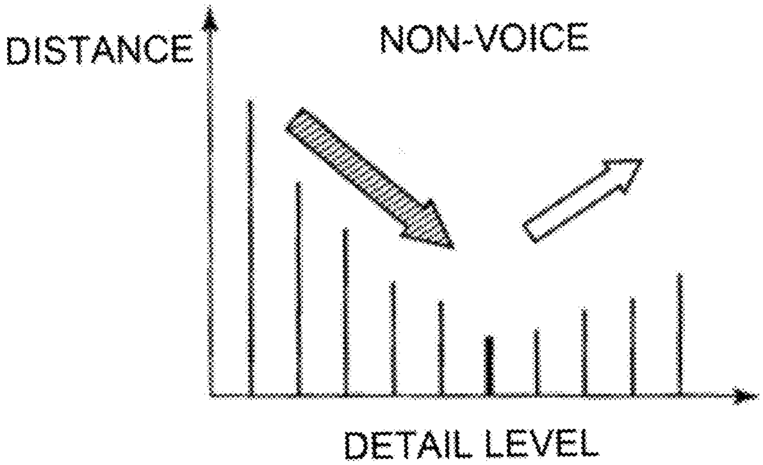

For example, if the feature property of the input signal is close to the feature property of the learning data used when the voice model was developed as shown in FIG. 5A, the distance corresponding to a voice model having a higher detail level becomes shorter. This is because, when a voice model is created in the top-down method, the voice model can be created by increasing the number of probability distribution functions when the number of mixtures is increased so that the distance to the learning data becomes shorter. Conversely, if the feature property of the input signal is far from the feature property of the learning data, the distance becomes larger as the detail level of the voice model becomes higher as shown in FIG. 5B. Therefore, it can be said that, when the detail level judgment unit 9 selects a voice model having a higher detail level, the feature property of the input signal is close to the feature property of the learning data and that, when the detail level judgment unit 9 selects a voice model having a lower detail level, the feature property of the input signal is far from the feature property of the learning data.

Dynamically controlling the voice recognition related parameters according to the detail level based on the property described above reduces the number of hypotheses when the detail level is high and, thereby, reduces the calculation amount, thus enabling the voice recognition to be carried out highly accurately at an optimum calculation cost.

Selecting a detail level whose distance to the input voice is closest means that the voice model, created in such a state in which the highest detail level state is selected, represents the input voice most accurately. This means that the information on the shortest detail level gives the information on the number of competing candidates for a word string at one particular time of target and that the parameters can be set with consideration for the number of competing candidates but without need for conducting the time-consuming averaging calculation.

In addition, a voice model having multiple detail levels has a size sufficiently smaller than that of an acoustic model, thus reducing the calculation cost as compared with that of the method in which the conventional simplified acoustic model is used.

Second Exemplary Embodiment

Next, the following describes a second exemplary embodiment of the present invention. The basic configuration of a voice recognition device in this exemplary embodiment is the same as that of the voice recognition device described in the first exemplary embodiment.

A detail level judgment unit 9 carries out calculation for the voice model having multiple detail levels sequentially, from a low detail level to a high detail level, in step S4 shown in the first exemplary embodiment to find the detail level whose distance to the feature amount, calculated by a feature amount calculation unit 2, is a minimum. The detail level judgment unit 9 may also carry out calculation sequentially, from a high detail level to a low detail level, to find the detail level whose distance to the feature amount, calculated by the feature amount calculation unit 2, is a minimum.

In this exemplary embodiment, a distance calculation unit 8 calculates the distance sequentially from a low detail level to a high detail level, or from a high detail level to a low detail level. And, the detail level judgment unit 9 finds the detail level corresponding to the distance, calculated by the distance calculation unit 8, that is the minimum.

As described above, this exemplary embodiment finds the detail level whose distance to the feature amount, calculated by a feature amount calculation unit 2, is the minimum to allow the detail level corresponding to the minimum distance to be found efficiently.

For example, when the feature property of the input signal is close to the feature property of the learning data, the distance is decreased monotonously as the detail level is increased as shown in FIG. 5A and the distance becomes the minimum when the detail level is at the highest. When the feature property of the input signal is far from the feature property of the learning data, the distance is decreased monotonously as the detail level is increased and, beginning at an intermediate point, is increased monotonously as shown in FIG. 5B. Based on such a property, this exemplary embodiment carries out calculation for a voice model having multiple detail levels sequentially from a low detail level to a high detail level to find the detail level whose distance is a minimum to allow the detail level, corresponding to the minimum distance, to be found efficiently.

Third Exemplary Embodiment

Figure 6:
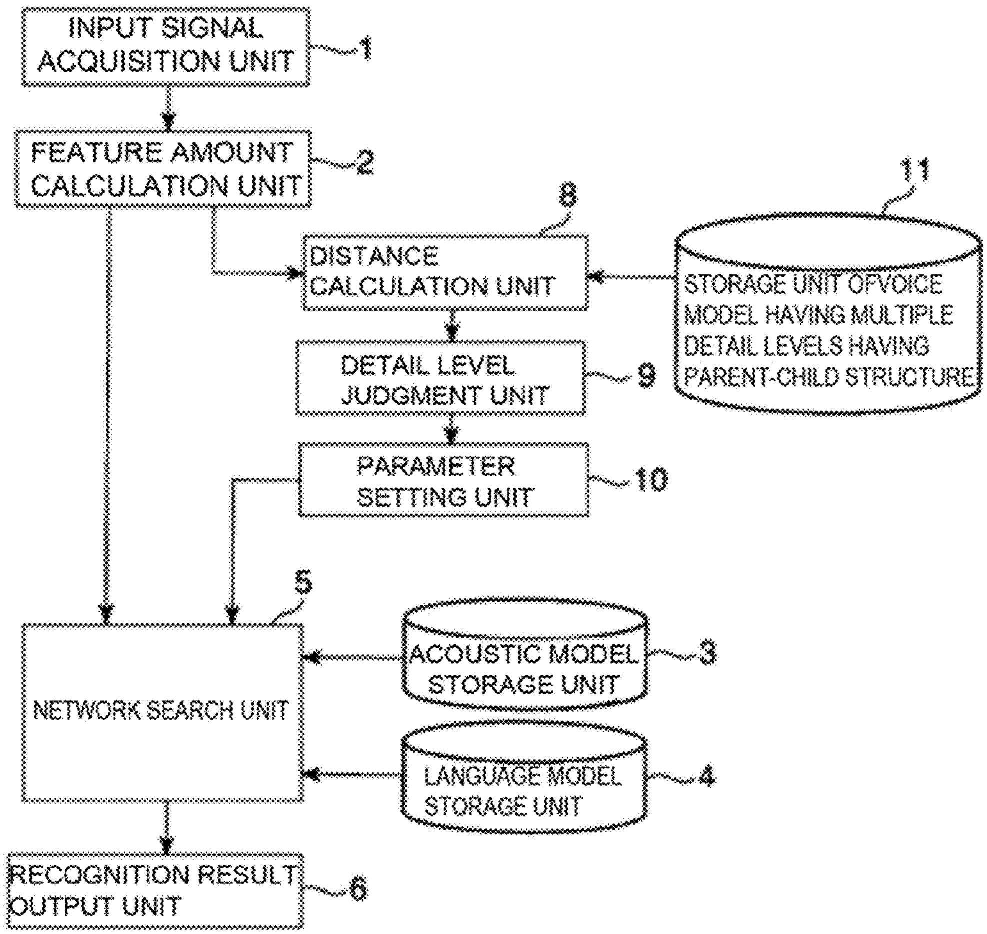
FIG. 6 is a block diagram showing an example of the configuration of a voice recognition device in a third exemplary embodiment.

Next, the following describes a third exemplary embodiment of the present invention with reference to the drawings. FIG. 6 is a block diagram showing an example of the configuration of a voice recognition device in the third exemplary embodiment. As shown in FIG. 6, the voice recognition device in this exemplary embodiment is different from the voice recognition device in the first exemplary embodiment in that a voice model storage unit 11, which stores a voice model having multiple detail levels having a parent-child structure is provided instead of the voice model storage unit 7, shown in FIG. 1, that stores a voice model having multiple detail levels.

The voice model storage unit 11 is implemented in the actual device by a storage device such as a magnetic disk device or an optical disc device. The voice model storage unit 11 stores a voice model having multiple detail levels having a parent-child structure.

Figure 7:
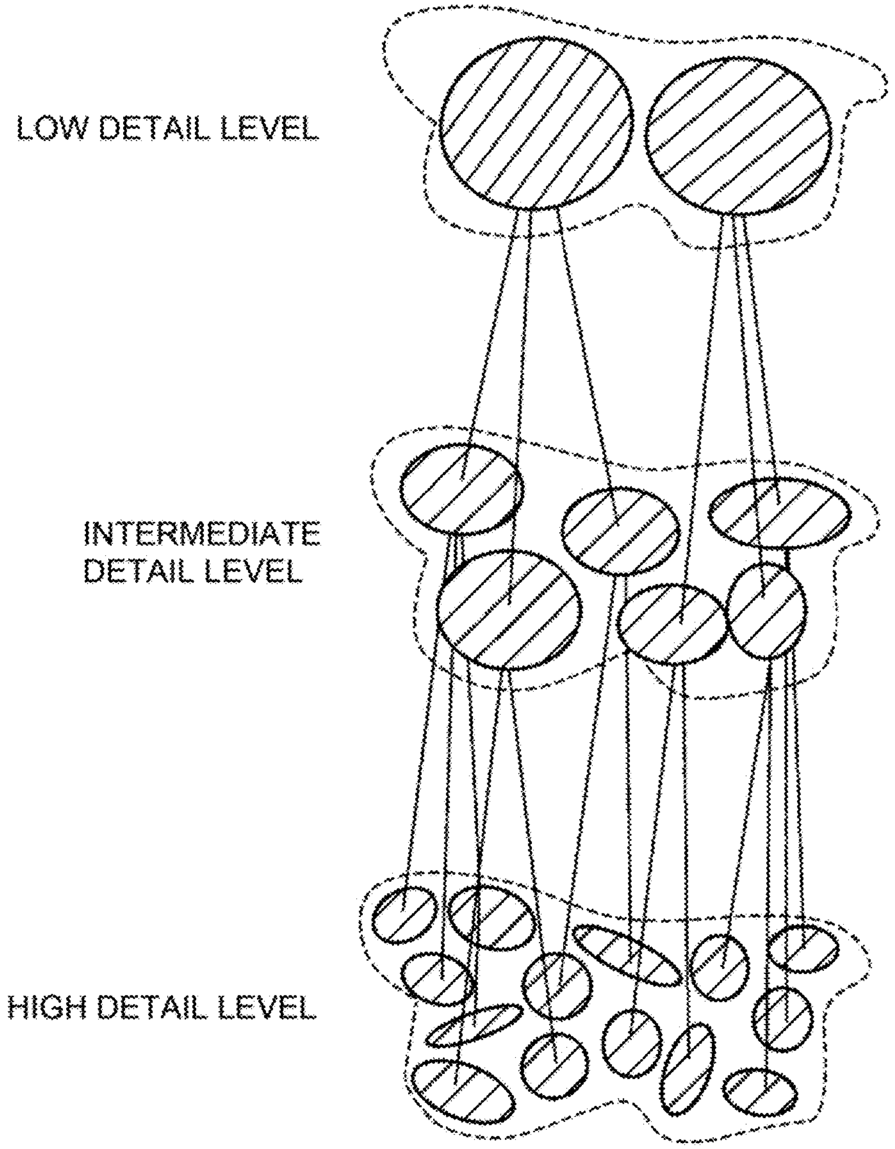
FIG. 7 is a diagram schematically showing a voice model having multiple detail levels having a parent-child structure.

In this exemplary embodiment, the detail levels of the voice model, which is stored in the voice model storage unit 11 and has multiple detail levels, have a parent-child structure such as a tree structure. The parent-child structure mentioned here refers to the dependence relation between the probability distribution functions (child) belonging to a high detail level and the probability distribution functions (parent) belonging to a low detail level as shown in FIG. 7. In FIG. 7, the solid line joining one ellipse to another indicates that there is a relation between the parent distribution and the child distribution.

To create a parent-child relation, a parent distribution is divided into child distributions when the voice model is created in the top-down method. When the voice model is created in the bottom-up method, two or more child distributions are rearranged (or reconstructed) into a parent distribution. The voice model having such a parent-child structure is created in advance by the system designer and is stored in the voice model storage unit 11.

Next, the following describes the operation. In this exemplary embodiment, a detail level judgment unit 9 carries out calculation for the voice model, which has multiple detail levels having a parent-child structure, sequentially from a low detail level to a high detail level in step S4 shown in the first exemplary embodiment and finds a detail level that has the minimum distance to the feature amount calculated by a feature amount calculation unit 2. In this case, there is a parent-child structure among the distributions belonging to the detail levels and so, once a distribution whose distance is the minimum is found at some detail level, the detail level judgment unit 9 is required to carry out calculation only for the child distributions of the distribution whose distance is already found as the minimum if it is necessary to carry out calculation for the detail levels higher than the detail level whose distance is the minimum. For example, a distance calculation unit 8 and the detail level judgment unit 9 carry out the distance calculation and the minimum detail level judgment processing only for the child distributions of the distribution whose distance is found as the minimum.

This exemplary embodiment uses the configuration described above to allow the distance calculation unit 8 to carry out the distance calculation at a low calculation cost, thus further reducing the calculation cost of the voice recognition system as compared with that shown in the first exemplary embodiment.

Fourth Exemplary Embodiment

Next, the following describes a fourth exemplary embodiment of the present invention with reference to the drawings. In this exemplary embodiment, the basic configuration of a voice recognition device is the same as the configuration of the voice recognition device shown in the first exemplary embodiment.

This exemplary embodiment is different from the first exemplary embodiment in that relevance is established between a voice model having multiple detail levels stored in a voice model storage unit 7 and an acoustic model stored in an acoustic model storage unit 3.

In this exemplary embodiment, the acoustic model storage unit 3 stores, in advance, an acoustic model having predetermined relevance with a voice model stored in the voice model storage unit 7. The voice model storage unit 7 stores, in advance, a voice model having predetermined relevance with an acoustic model stored in the acoustic model storage unit 3. A network search unit 5 searches for candidates for a word string and extracts the candidates based on the relevance between the voice model and the acoustic model.

Figure 8:
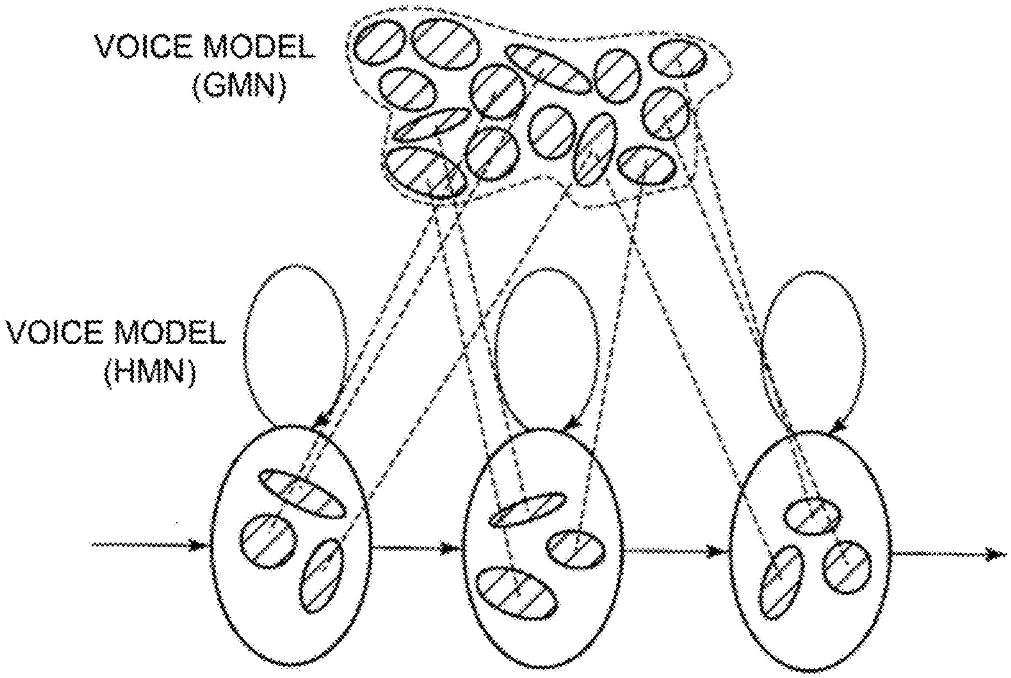
FIG. 8 is a diagram showing relevance between a voice model having multiple detail levels and a sound level.

In this exemplary embodiment, to establish relevance between a voice model having multiple detail levels and an acoustic model, the multiple probability density functions constituting the voice model having multiple detail levels and the multiple probability density functions constituting the acoustic model, which are the same or similar with each other, are configured as shown in FIG. 8 so that it can be understood that they are relevant to each other. For example, the link is created in advance by adding link information to the voice model and the sound mode that are the same or similar with each other. In the example shown in FIG. 8, the broken line (or lines) joining the voice model to the acoustic model indicates the relevance between the voice model and the acoustic model.

The processing for establishing relevance between the voice model and the acoustic model (for example, a link is created) is performed in advance by the system designer, and the processed voice data and sound data are stored respectively in the voice model storage unit 7 and the acoustic model storage unit 3.

This exemplary embodiment uses the configuration described above to omit the calculation of the distance between the input signal and the acoustic model that is carried out when searching for a word string in step S6 in the first exemplary embodiment. That is, based on the relevance given to the voice model and the acoustic model in advance, the distance from the input signal to the voice model having multiple detail levels, found in step S3, is used to omit the calculation described above. As a result, the processing load of the network search unit 5 in the processing in step 6 is reduced.

Fifth Exemplary Embodiment

Figure 9:
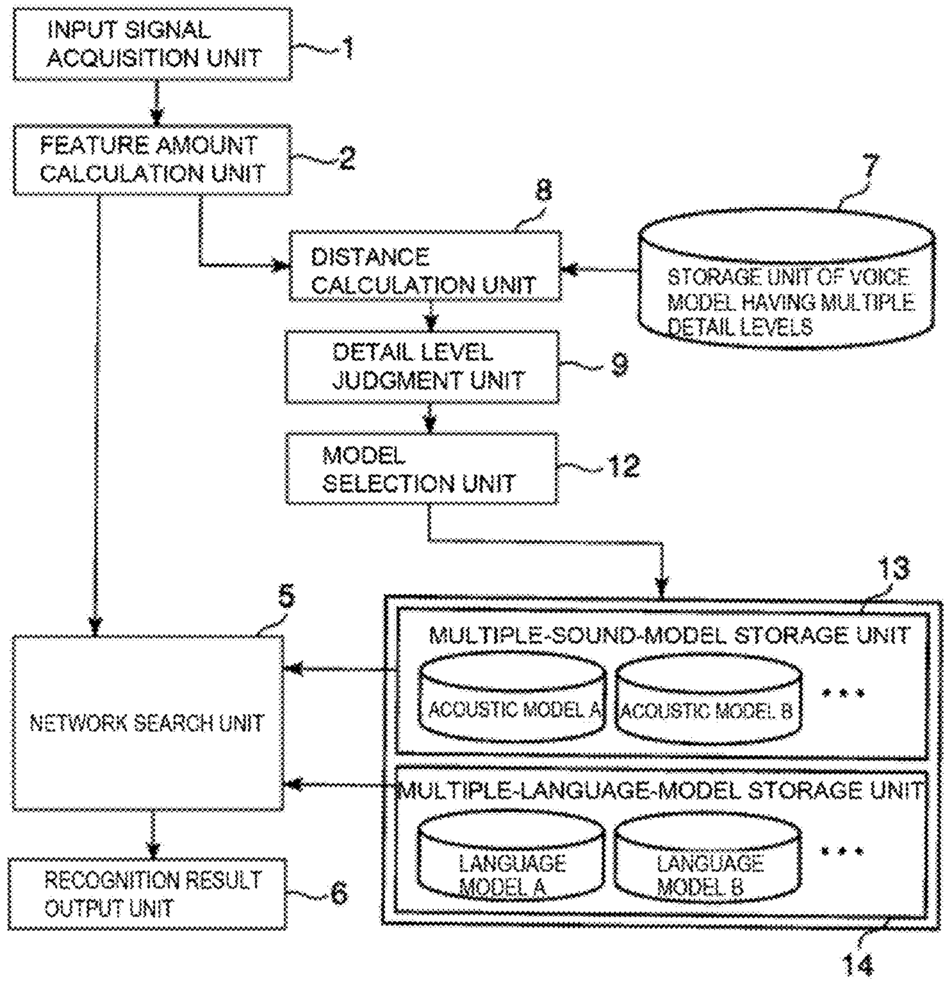
FIG. 9 is a block diagram showing an example of the configuration of a voice recognition device in a fifth exemplary embodiment.

Next, the following describes a fifth exemplary embodiment of the present invention with reference to the drawings. FIG. 9 is a block diagram showing an example of the configuration of a voice recognition device in the fifth exemplary embodiment. As shown in FIG. 9, this exemplary embodiment is different from the first exemplary embodiment in that the voice recognition device includes an acoustic model storage unit 13, which stores multiple acoustic models, instead of the acoustic model storage unit 3. In addition, this exemplary embodiment is different from the first exemplary embodiment in that the voice recognition device includes a language model storage unit 14, which stores multiple language models, instead of the language model storage unit 4. In addition, this exemplary embodiment is different from the first exemplary embodiment in that the voice recognition device includes a model selection unit 12 instead of the parameter setting unit 10 that sets the parameters according to the detail level calculated by a detail level judgment unit 9.

The model selection unit 12 is implemented in the actual device by the CPU of an information processing device operating under program control. The model selection unit 12 has the function to select an acoustic model and a language model according to the detail level calculated by the detail level judgment unit 9. That is, the model selection unit 12 selects a set of an acoustic model and a language model from the multiple acoustic models stored in the acoustic model storage unit 3 and the multiple language models stored in the language model storage unit 4 according to the detail level selected by the detail level judgment unit 9.

Next, the following describes the operation. In the first exemplary embodiment, the parameter setting unit 10 sets the parameters, which will be used when the network search unit 5 searches for a word string, in step S5 in FIG. 3 using the detail level judged by the detail level judgment unit 9. In this exemplary embodiment, after the detail level judgment unit 9 judges (calculates) the detail level, the model selection unit 12 does not perform the processing of step S5 in FIG. 3; instead, the model selection unit 12 uses the detail level, judged by the detail level judgment unit 9, to perform the model selection processing for selecting the acoustic model and the language model for use by the network search unit 5 to search for a word string. And, based on the acoustic model and the language model selected by the model selection unit 12, the network search unit 5 searches for, and selects, candidates for a word string.

This exemplary embodiment uses the configuration described above to select a smaller-size acoustic model, or to switch the language model to a model having a smaller number of vocabularies, when the detail level judgment unit 9 judges that the detail level is low, thus increasing voice recognition accuracy. In this exemplary embodiment, the voice recognition device controls the selection of the voice model and the language model as described above according to the conditions such as the input voice.

Sixth Exemplary Embodiment

Figure 10:
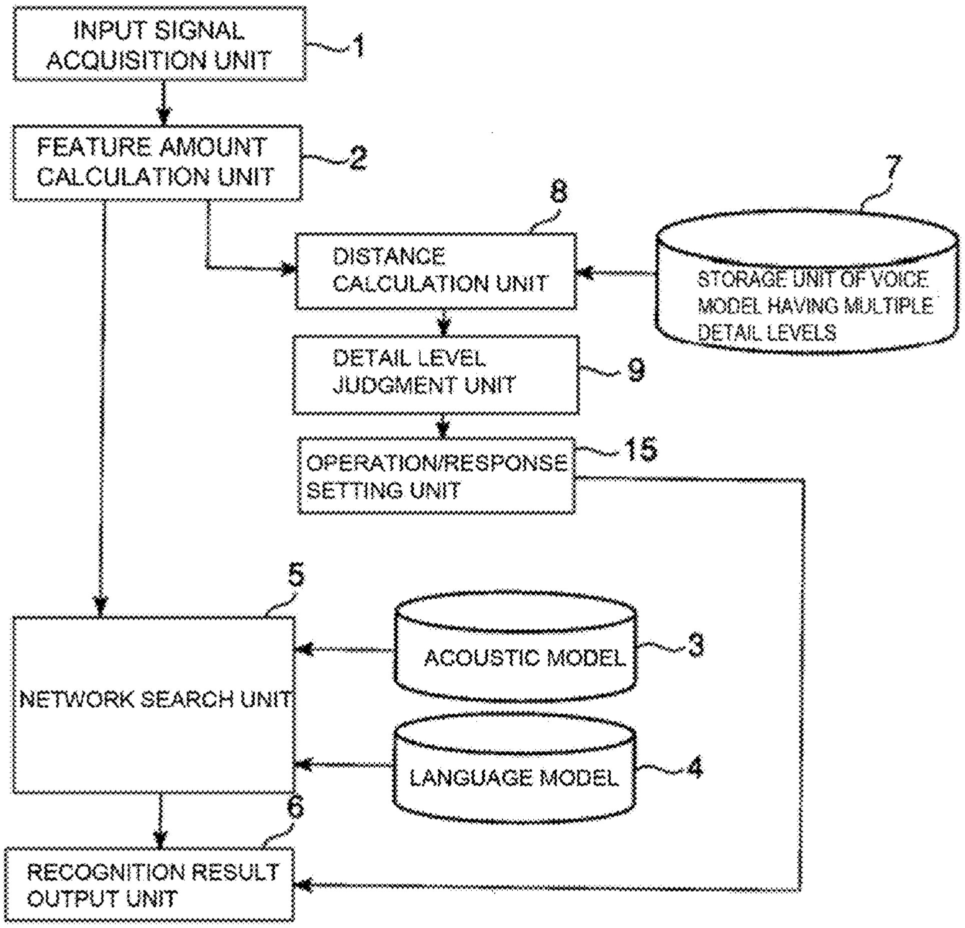
FIG. 10 is a block diagram showing an example of the configuration of a voice recognition device in a sixth exemplary embodiment.

Next, the following describes a sixth exemplary embodiment of the present invention with reference to the drawings. FIG. 10 is a block diagram showing an example of the configuration of a voice recognition device in the sixth exemplary embodiment. As shown in FIG. 10, this exemplary embodiment is different from the first exemplary embodiment in that the voice recognition device includes an operation/response setting unit 15 instead of the parameter setting unit 10 that sets the parameters according to the detail level calculated by a detail level judgment unit 9.

The operation/response setting unit 15 is implemented in the actual device by the CPU of an information processing device operating under program control. The operation/response setting unit 15 has function to change the output means or the output contents according to the detail level judged by the detail level judgment unit 9. That is, the operation/response setting unit 15 changes the output method or the output contents of the voice recognition result of the input voice signal according to the detail level selected by the detail level judgment unit 9.

In this exemplary embodiment, the operation/response setting unit 15 causes a recognition result output unit 6 to display a message, which prompts the user to produce a sound again for inputting a voice, when the detail level judgment unit 9 judges that the detail level is low. Alternatively operation/response setting unit 15 may cause the recognition result output unit 6 to display a message indicating that speaker learning is necessary. The operation/response setting unit 15 may alternatively cause the recognition result output unit 6 to display a message requesting the user to check if the voice recognition result is correct. The operation/response setting unit 15 may also control the recognition result output unit 6 not to display only the recognition result when the detail level judgment unit 9 judges that the detail level is low.

This exemplary embodiment uses the configuration described above to display the reliable recognition results only.

Seventh Exemplary Embodiment

Figure 11:
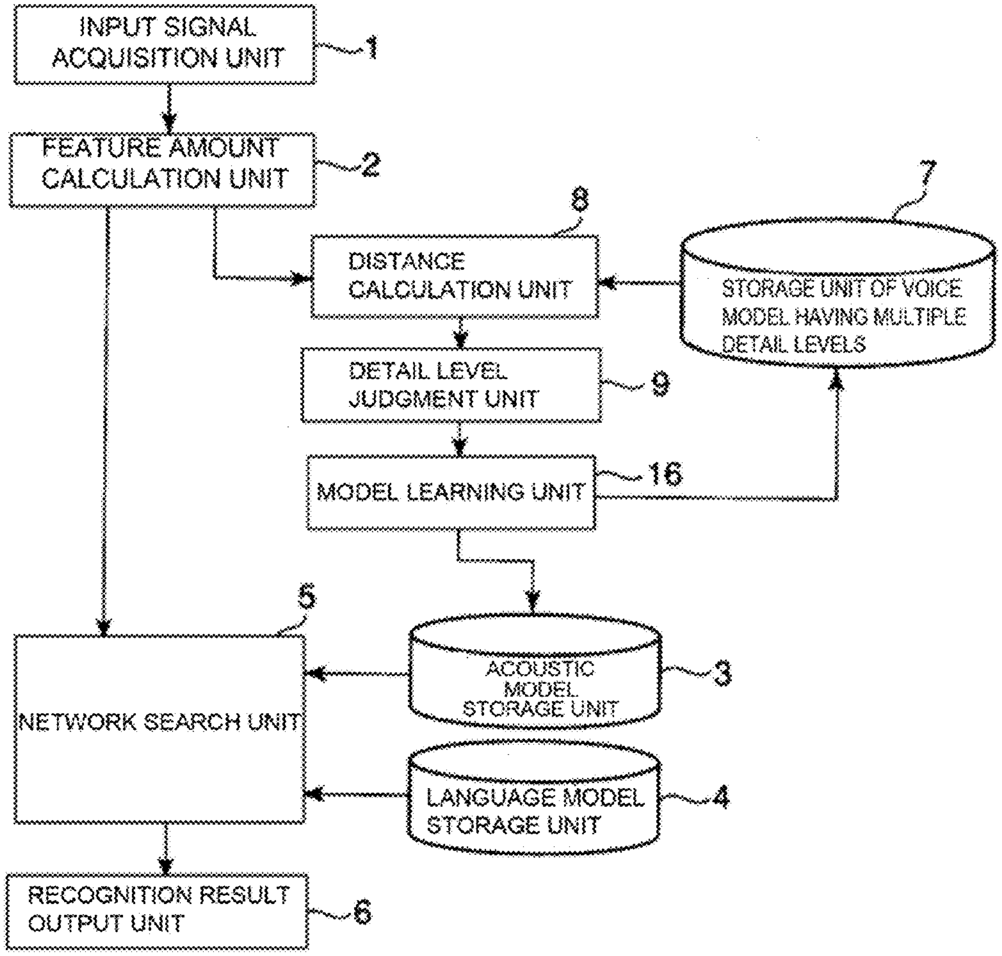
FIG. 11 is a block diagram showing an example of the configuration of a voice recognition device in a seventh exemplary embodiment.
Figure 12:
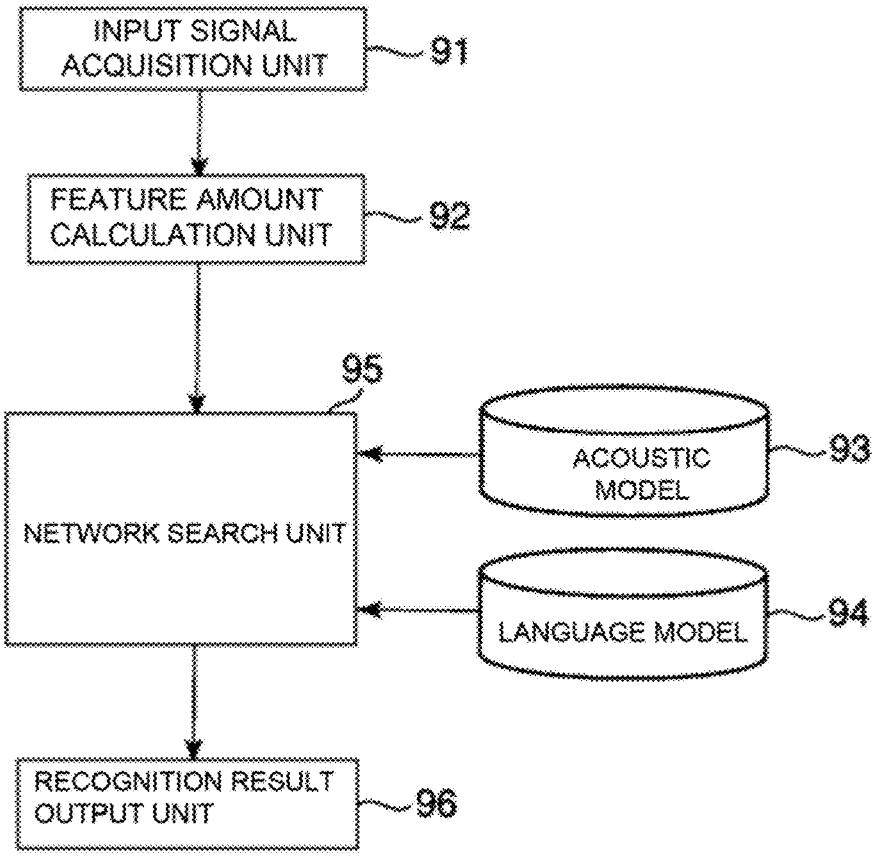
FIG. 12 is a block diagram showing an example of the configuration of a customary voice recognition device that uses a voice recognition technology described in Non-Patent Document 1.
Figure 13:
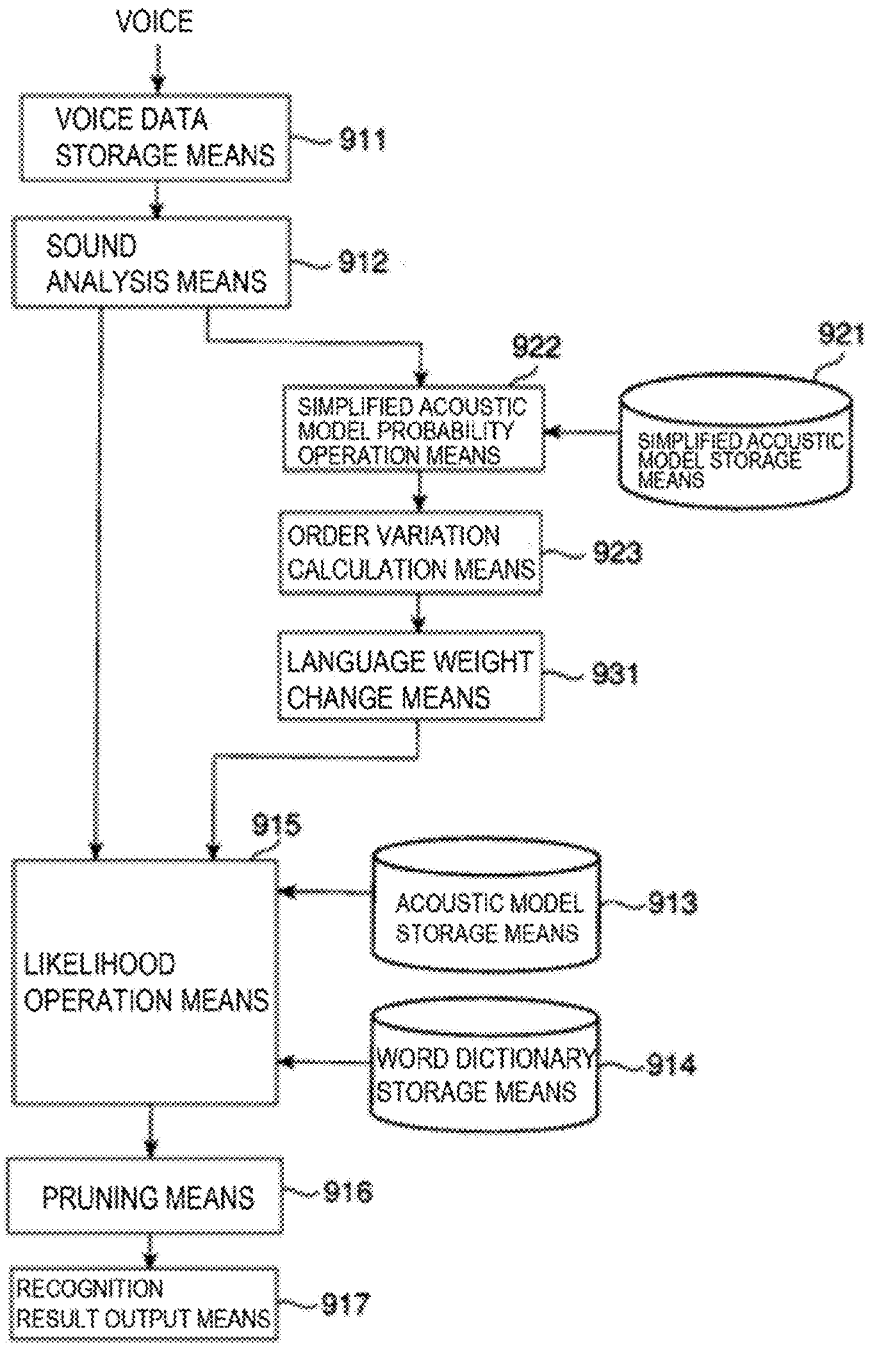
FIG. 13 is a block diagram showing an example of the configuration of the voice recognition device described in Patent Document 1.

Next, the following describes a seventh exemplary embodiment of the present invention with reference to the drawings. FIG. 11 is a block diagram showing an example of the configuration of a voice recognition device in the seventh exemplary embodiment. As shown in FIG. 11, this exemplary embodiment is different from the first exemplary embodiment in that the voice recognition device includes a model learning unit 16 instead of the parameter setting unit 10 that sets the parameters according to the detail level calculated by a detail level judgment unit 9.

The model learning unit 16 is implemented in the actual device by a CPU of an information processing device operating under program control. The model learning unit 16 has a function to cause a voice model having multiple detail levels as well as an acoustic model to learn according to the detail level calculated by a detail level judgment unit 9. That is, the model learning unit 16 updates the voice model, stored in the voice model storage unit 7, according to the detail level selected by the detail level judgment unit 9 to adapt the voice model to the speaker environment or the noise environment.

In this exemplary embodiment, if the detail level judgment unit 9 judges that the detail level is low, the acoustic model learning unit 16 controls the voice model having multiple detail levels as well as the acoustic model to be adapted to the noise environment or the speaker environment so that the detail level is increased. More specifically, if the detail level is low because the detail level of the voice model having multiple detail levels is biased on average in relation to the input signal, the model learning unit 16 corrects the bias of the voice model and controls it so that the detail level is increased. The model learning unit 16 also corrects the bias of the acoustic model in accordance with the correction of the voice model.

This exemplary embodiment uses the configuration described above to allow the voice recognition result to be output appropriately even if the noise environment or the speaker environment has changed greatly from that at the learning time.

In the voice recognition device, any of the configurations shown in the exemplary embodiments described above may be combined. For example, two or more of the configurations of the voice recognition device shown in the first exemplary embodiment to the seventh exemplary embodiment may be combined to configure a voice recognition device.

The exemplary embodiments and the examples may be changed and adjusted in the scope of the entire disclosures (including claims) of the present invention and based on the basic technological concept thereof. Within the scope of the claims of the present invention, various disclosed elements may be combined and selected in a variety of ways.

INDUSTRIAL APPLICABILITY

The present invention is applicable to a voice recognition device that recognizes the voice of an input voice. In particular, the present invention is applicable to a voice recognition device that implements the optimum voice recognition performance at a predetermined calculation cost.

What is claimed is:

1. A voice recognition device that recognizes a voice of an input voice signal, comprising:

an acoustic model storage unit that stores an acoustic model used for word string search;

a voice model storage unit that stores in advance a predetermined voice model having a plurality of detail levels, said plurality of detail levels being information indicating a feature property of a voice for said voice model, the voice model having a size smaller than that of the acoustic model used for word string search;

a detail level selection unit that selects a detail level, closest to a feature property of a portion of an input voice signal, from the detail levels of the voice model stored in said voice model storage unit;

a parameter setting unit that sets parameters for recognizing the portion of the input voice signal according to the detail level selected by said detail level selection unit, the parameters being set prior to use of the acoustic model to recognize the portion of the input voice signal; and a distance calculation unit that calculates distance information indicating a difference between each of the plurality of detail levels of the voice model stored in the voice model storage unit and the feature property of the input voice signal, wherein the detail level selection unit selects a detail level based on the distance information calculated by the distance calculation unit.

2. The voice recognition device as defined by claim 1, wherein said detail level selection unit finds a detail level on a unit time basis and selects the detail level closest to the feature property of the input voice signal.

3. The voice recognition device as defined by claim 2, wherein said detail level selection unit performs statistical analysis of the detail level, selected on a unit time basis, for a plurality of unit times and finds a detail level of one particular unit time of interest.

4. The voice recognition device as defined by claim 1, wherein said distance calculation unit calculates the distance information sequentially from low detail level distance information to higher detail level distance information, or sequentially from high detail level distance information to lower detail level distance information and said detail level selection unit finds a detail level corresponding to a minimum of the distance information calculated by said distance calculation unit.

5. The voice recognition device as defined by claim 1, wherein said voice model storage unit stores in advance a voice model having a parent-child structure.

6. The voice recognition device as defined by claim 1, further comprising:

a word string search unit that searches for, and extracts, a word string as a result of voice recognition based on the parameters that are set by said parameter setting unit, wherein said acoustic model storage unit stores in advance an acoustic model having predetermined relevance to the voice model stored in said voice model storage unit; and said word string search unit searches for, and extracts, a word string using relevance between the voice model and the acoustic model.

7. The voice recognition device as defined by claim 1, wherein said parameter setting unit sets at least one of a language weight parameter and a pruning parameter for performing predetermined pruning processing according to the detail level selected by said detail level selection unit.

8. The voice recognition device as defined by claim 1, further comprising:

an acoustic model storage unit that stores a plurality of predetermined acoustic models in advance;

a language model storage unit that stores a plurality of predetermined language models in advance; and a model selection unit that selects a set of an acoustic model and a language model from the plurality of acoustic models, stored in said acoustic model storage unit, and the plurality of language models, stored in said language model storage unit, according to the detail level selected by said detail level selection unit.

9. The voice recognition device as defined by claim 1, further comprising: an output change unit that changes an output method or an output content of a voice recognition result of the input voice signal according to the detail level selected by said detail level selection unit.

10. The voice recognition device as defined by claim 1, further comprising a voice model update unit that updates the voice model, stored in said voice model storage unit, according to the detail level selected by said detail level selection unit.

11. The voice recognition device as defined by claim 1, wherein said parameter setting unit sets one or more search parameters according to the detail level selected by said detail level selection unit;

wherein the voice recognition device further comprises a search unit that uses the acoustic model to extract candidate words for the input voice signal according to the one or more search parameters set according to the detail level selected by said detail level selection unit.

12. The voice recognition device as defined by claim 1, wherein the parameters set by the parameter setting unit according to the detail level selected by said detail level selection unit comprise a language weight that indicates a weight of a language model relative to the acoustic model during recognition of the input voice signal.

13. A voice recognition method that recognizes a voice of an input voice signal, comprising:

a detail level selection step that selects a detail level, closest to a feature property of a portion of an input voice signal, from a plurality of detail levels of a predetermined voice model stored in advance, said plurality of detail levels being information indicating a feature property of a voice for the voice model, the voice model having a size smaller than that of an acoustic model used for word string search;

a distance calculation step that calculates distance information indicating a difference between each of the plurality of detail levels of the voice model and the feature property of the input voice signal, wherein the detail level selection processing selects the detail level based on the distance information calculated by the distance calculation unit; and a parameter setting step that sets parameters for recognizing the portion of the input voice according to the selected detail level, the parameters being set prior to use of the acoustic model to recognize the portion of the input voice signal.

14. The voice recognition method as defined by claim 13, wherein said detail level selection step finds a detail level on a unit time basis and selects the detail level closest to the feature property of the input voice signal.

15. The voice recognition method as defined by claim 14, wherein said detail level selection step performs a statistical analysis of the detail level, selected on a unit time basis, for a plurality of unit times and finds a detail level of one particular unit time of interest.

16. The voice recognition method as defined by claim 13, wherein said distance calculation step calculates the distance information sequentially from low detail level distance information to higher detail level distance information, or sequentially from high detail level distance information to lower detail level distance information and said detail level selection step finds a detail level corresponding to a minimum of the calculated distance information.

17. The voice recognition method as defined by claim 13, wherein the detail level closest to the feature property of the input voice signal is selected based on a voice model stored in advance and having a parent-child structure.

18. The voice recognition method as defined by claim 13, further comprising:

a word string search step that searches for, and extracting, a word string as a result of voice recognition based on the parameters that are set, wherein an acoustic model having predetermined relevance to the voice model is stored in advance, and said word string search step searches for, and extracts, a word string using relevance between the voice model and the acoustic model.

19. The voice recognition method as defined by claim 13, wherein said parameter setting step sets at least one of a language weight parameter and a pruning parameter for performing predetermined pruning processing according to the selected detail level.

20. The voice recognition method as defined by claim 13, further comprising a model selection step that selects a set of an acoustic model and a language model from a plurality of acoustic models stored in advance and a plurality of language models stored in advance according to the selected detail level.

21. The voice recognition method as defined by claim 13, further comprising an output change step that changes an output method or an output content of a voice recognition result of the input voice signal according to the selected detail level.

22. A non-transitory computer-readable storage medium storing a program that recognizes a voice of an input voice signal, said program causing a computer to execute:

detail level selection processing that selects a detail level, closest to a feature property of a portion of an input voice signal, from a plurality of detail levels of a predetermined voice model stored in advance, said plurality of detail levels being information indicating a feature property of a voice for said voice model, the voice model having a size smaller than that of an acoustic model used for word string search;

distance calculation processing that calculates distance information indicating a difference between each of the plurality of detail levels of the voice model and the feature property of the input voice signal, wherein the detail level selection processing selects the detail level based on the distance information calculated by the distance calculation unit; and parameter setting processing that sets parameters for recognizing the portion of the input voice according to the selected detail level, the parameters being set prior to use of the acoustic model to recognize the portion of the input voice signal.

* * * * *